(12) United States Patent
Jiang et al.

(10) Patent No.: US 11,927,713 B2
(45) Date of Patent: Mar. 12, 2024

(54) METHOD, DEVICE AND MEDIUM FOR ACQUIRING LOGGING PARAMETERS

(71) Applicant: CHINA OILFIELD SERVICES LIMITED, Tianjin (CN)

(72) Inventors: Zhimin Jiang, Hebei (CN); Yupu Dang, Hebei (CN); Zhibo Xue, Hebei (CN); Jiawei Zhang, Hebei (CN)

(73) Assignee: CHINA OILFIELD SERVICES LIMITED, Tianjin (CN)

( * ) Notice: Subject to any disclaimer, the term of this patent is extended or adjusted under 35 U.S.C. 154(b) by 145 days.

(21) Appl. No.: 17/434,172

(22) PCT Filed: Feb. 8, 2021

(86) PCT No.: PCT/CN2021/075995
§ 371 (c)(1),
(2) Date: Aug. 26, 2021

(87) PCT Pub. No.: WO2021/208578
PCT Pub. Date: Oct. 21, 2021

(65) Prior Publication Data
US 2022/0342108 A1 Oct. 27, 2022

(30) Foreign Application Priority Data
Apr. 17, 2020 (CN) .......................... 202010305348.7

(51) Int. Cl.
*G01V 3/32* (2006.01)
*E21B 49/00* (2006.01)
(52) U.S. Cl.
CPC ................ *G01V 3/32* (2013.01); *E21B 49/00* (2013.01)
(58) Field of Classification Search
None
See application file for complete search history.

(56) References Cited

U.S. PATENT DOCUMENTS 10,429,535 B2 * 10/2019 Heaton .................... G01V 3/32
2011/0154895 A1    6/2011 Charara et al.
(Continued)

FOREIGN PATENT DOCUMENTS

CA    2869778 C    6/2016
CN    101344001 A  1/2009
(Continued)

OTHER PUBLICATIONS

International Search Report and Written Opinion for Application No. PCT/CN2021/075995, dated Apr. 16, 2021, 10 Pages.
(Continued)

*Primary Examiner* — Douglas X Rodriguez
(74) *Attorney, Agent, or Firm* — Brooks Kushman P.C.

(57) ABSTRACT

A method, a device and a medium for acquiring logging parameters are provided, wherein the logging parameters include gas-bearing porosities, and the method includes: acquiring a two-dimensional nuclear magnetic logging analysis graph; determining a gas-bearing region from the two-dimensional nuclear magnetic logging analysis graph; and summing contour values of the gas-bearing region as a gas-bearing porosity. The device for acquiring logging parameters includes a processor and a computer readable storage medium, wherein instructions are stored in the computer readable storage medium, and the processor executes the instructions to perform the foregoing method for acquiring logging parameters. The medium for acquiring logging parameters stores computer executable instructions, which are used for executing the foregoing method for acquiring logging parameters.

9 Claims, 2 Drawing Sheets

(56) References Cited

U.S. PATENT DOCUMENTS

| | | | | |
|---|---|---|---|---|
| 2012/0035851 | A1* | 2/2012 | Romero | G01V 3/32 324/303 |
| 2013/0113480 | A1* | 5/2013 | Kadayam Viswanathan | G01V 3/32 324/303 |
| 2018/0246999 | A1 | 8/2018 | Feng et al. | |

FOREIGN PATENT DOCUMENTS

| CN | 104280703 A | 1/2015 |
|---|---|---|
| CN | 104697915 A | 6/2015 |
| CN | 105182431 A | 12/2015 |
| CN | 106930754 A | 7/2017 |
| CN | 108049866 A | 5/2018 |
| CN | 110320227 A | 10/2019 |
| CN | 111535796 A | 8/2020 |

OTHER PUBLICATIONS

First Office Action for Chinese Application No. 202010305348.7, dated Feb. 11, 2023, 13 Pages (incl. English Translation).

Cheng et al., "A study of regulation inversion method in 2D DMR logging based on SVD and BRD," Chinese Journal of Geophysics, Oct. 2014, pp. 3453-3465, vol. 57, No. 10, DOI: 10.6038/cjg20141031, 13 Pages (incl. English Abstract).

Jiang et al., "Processing Algorithm and Application of 2D NMR D-T2 Data," Well Logging Technology, Feb. 2020, pp. 27-31, vol. 44, No. 1, DOI: 10.16489/j.issn. 1004-1338.2020.01.006, 5 Pages (incl. English Abstract).

Li et al., "Review on Fluid Identification Methods with NMR Logging," Well Logging Technology, Oct. 2011, pp. 396-401, vol. 35, No. 5, 6 Pages. (incl. English Abstract).

Second Office Action for Chinese Application No. 202010305348.7, dated Aug. 26, 2023, 11 Pages (incl. English Translation).

* cited by examiner

METHOD, DEVICE AND MEDIUM FOR ACQUIRING LOGGING PARAMETERS

CROSS-REFERENCE TO RELATED APPLICATIONS

This application is the U.S. national phase of PCT Application No. PCT/CN2021/075995 filed on Feb. 8, 2021, which claims priority to Chinese Patent Application No. 202010305348.7 filed on Apr. 17, 2020, both of which are incorporated herein by reference in their entireties.

TECHNICAL FIELD

The present application relates to, but is not limited to, the field of logging, in particular to a method, a device and a medium for acquiring logging parameters

BACKGROUND

In some technologies, a gas saturation curve is analyzed by resistivity logging through the Archie Equation to obtain a related water saturation curve. The measured horizon, by default, is that everything except water is gas, and the gas saturation is obtained by subtracting the water saturation calculated by the Archie Equation from 100%. Porosity cannot be calculated directly. Instead, it is acquired by multiplying total pores by the above gas saturation after acquiring the total pores based on one-dimensional nuclear magnetic T2 spectrum or other techniques.

In some techniques, errors generated by the Archie Equation may be relatively large due to various factors that can affect the method for measuring gas saturation. Meanwhile, it is assumed that the influence of rock framing on resistivity also exists in addition to the influence of gas and water on resistivity in the formation, and these unpredictable factors may result in larger errors in the measured curves. Although one-dimensional nuclear magnetic technology is capable of measuring gas by difference spectrum shift, overlapped spectrum distribution will occurs in a T2 spectrum of the echo signals measured by the one-dimensional NMR, which brings difficulties to the identification of fluid properties. To sum up, the calculation methods of the aforementioned measurement methods are not intuitive enough, and the measurement accuracy is restricted.

SUMMARY

The following is a summary of the subject matter described in detail herein. This summary is not intended to limit the protection scope of the claims.

Embodiments of the present application provide a method and a device for acquiring logging parameters, which may improve the measurement accuracy, and the calculation approach is simple and intuitive.

An embodiment of the present application provides a method for acquiring logging parameters, wherein the logging parameters include a gas-bearing porosity, and the method includes:
  acquiring a two-dimensional nuclear magnetic logging analysis graph;
  determining a gas-bearing region from the two-dimensional nuclear magnetic logging analysis graph; and
  summing contour values of the gas-bearing region as the gas-bearing porosity.

In an exemplary embodiment of the present application, the two-dimensional nuclear magnetic logging analysis graph may include a two-dimensional nuclear magnetic D-T2 graph.

In an exemplary embodiment of the present application, acquiring the two-dimensional nuclear magnetic logging analysis graph may include:
  acquiring echo signals during logging;
  performing a two-dimensional inversion calculation on the echo signals according to a preset on-site inversion algorithm to acquire multi-dimensional logging parameters of different measured fluids in different formations; wherein the multi-dimensional logging parameters may include transverse relaxation time T2 and diffusion coefficient D;
  acquiring a two-dimensional nuclear magnetic D-T2 graph according to the transverse relaxation time T2 and the diffusion coefficient D; wherein different formations each correspond to one two-dimensional nuclear magnetic D-T2 graph.

In an exemplary embodiment of the present application, determining the gas-bearing region from the two-dimensional nuclear magnetic logging analysis graph may include:
  acquiring a diffusion coefficient D satisfying a first preset numerical range and a transverse relaxation time T2 satisfying a second preset numerical range from each two-dimensional nuclear magnetic D-T2 graph; and
  determining a region formed by the diffusion coefficient D satisfying the first preset numerical range and the transverse relaxation time T2 satisfying the second preset numerical range in each two-dimensional nuclear magnetic D-T2 graph as the gas-bearing region.

In an exemplary embodiment of the present application, the first preset numerical range may include: being greater than $10^{-8}$; and
  the second present numerical range may include: being greater than 500 ms.

In an exemplary embodiment of the present application, summing the contour values of the gas-bearing region as the gas-bearing porosity may include:
  respectively summing the contour values of the gas-bearing region in each two-dimensional nuclear magnetic D-T2 graph as the gas-bearing porosity in the formation corresponding to the two-dimensional nuclear magnetic D-T2 graph.

In an exemplary embodiment of the present application, the logging parameters may also include gas saturation; and
  the method may further include: calculating the gas saturation according to the calculated gas-bearing porosity and all the contour values in the two-dimensional nuclear magnetic logging analysis graph.

In an exemplary embodiment of the present application, the two-dimensional nuclear magnetic logging analysis graph may include a two-dimensional nuclear magnetic D-T2 graph.

The calculating the gas saturation according to the calculated gas-bearing porosity and all the contour values in the two-dimensional nuclear magnetic logging analysis graph may include:
  obtaining the gas saturation by dividing the gas-bearing porosity by a sum of all the contour values in the two-dimensional nuclear magnetic D-T2 graph.

In an exemplary embodiment of the present application, the method may further include:
  acquiring gas-bearing porosities and gas saturations calculated according to two-dimensional nuclear magnetic D-T2 graphs corresponding to different formations; and sequentially arranging the gas-bearing porosities corresponding to different formations according to depths of the formations to form a gas-bearing porosity curve, and sequentially arranging the gas saturations corresponding to different formations according to the depths of the formations to form a gas saturation curve.

An embodiment of the present application further provides a device for logging parameters, which may include a processor and a computer readable storage medium, wherein instructions are stored in the computer readable storage medium, and when the instructions are executed by the processor, any one of the foregoing methods for acquiring logging parameters is implemented.

The logging parameters according the embodiment of the present application include: gas-bearing porosity, and the method includes: acquiring a two-dimensional nuclear magnetic logging analysis graph; determining a gas-bearing region from the two-dimensional nuclear magnetic logging analysis graph; and summing contour values of the gas-bearing region as the gas-bearing porosity. The solution according to the embodiments of the present application can improve the measurement accuracy, and the calculation approach in the solution according to the embodiments of the present application is simpler and more intuitive.

Other features and advantages of the present disclosure will be set forth in the description which follows, and in part will be apparent from the description, or may be learned by practice of embodiments of the present application. Other advantages of the present description may be achieved and obtained by the solutions described in the specification and drawings.

Other aspects will be understood after reading and understanding the drawings and detailed description.

BRIEF DESCRIPTION OF DRAWINGS

The attached drawings are used to provide an understanding of technical solutions of the embodiments of the present application, and constitute a part of the specification. They are used together with embodiments of the present disclosure to explain the technical solutions of the present disclosure, and do not constitute a restriction on the technical solutions in the embodiments of the present disclosure.

DETAILED DESCRIPTION

Figure 1:
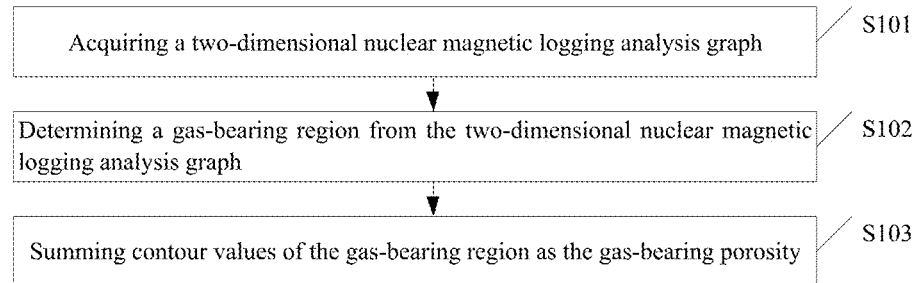
FIG. 1 is a flowchart of a method for acquiring logging parameters according to an embodiment of the present application.

Multiple embodiments are described in the present disclosure, but the description is exemplary rather than restrictive, and it is apparent to those of ordinary skills in the art that there may be more embodiments and implementation solutions within the scope of the embodiments described in the present disclosure. Although many possible combinations of features are shown in the drawings and discussed in the specific embodiments, many other combinations of the disclosed features are also possible. Unless specifically limited, any feature or element of any embodiment may be used in combination with or in place of any other feature or element of any other embodiment.

The present disclosure includes and contemplates combinations of features and elements known to those of ordinary skilled in the art. The disclosed embodiments, features and elements of the present disclosure may be combined with any conventional features or elements to form a unique inventive scheme defined by the claims. Any feature or element of any embodiment may also be combined with features or elements from other inventive solutions to form another unique inventive solution defined by the claims. Therefore, it should be understood that any of the features shown and discussed in the present disclosure may be implemented individually or in any suitable combination. Therefore, the embodiments are not otherwise limited except in accordance with the appended claims and equivalents thereof. In addition, various modifications and changes may be made within the protection scope of the appended claims.

Furthermore, when describing representative embodiments, the specification may have presented a method or process as a specific sequence of steps. However, to the extent that the method or the process does not depend on the specific order of steps described herein, the method or process should not be limited to the specific order of steps described. As those of ordinary skills in the art will understand, other orders of steps are also possible. Therefore, the specific order of steps set forth in the specification should not be interpreted as limitations on the claims. In addition, the claims for the method and/or the process should not be limited to the steps performed in the described order, and those of skilled in the art may easily understand that these orders may be varied but still remain within the essence and scope of the embodiments of the present disclosure.

An embodiment of the present application provides a method for acquiring logging parameters, wherein the logging parameters may include gas-bearing porosity. As shown in FIG. 1, the method may include S101-S103:

S101, acquiring a two-dimensional nuclear magnetic logging analysis graph.

S102, determining a gas-bearing region from the two-dimensional nuclear magnetic logging analysis graph.

S103, summing contour values (i.e. height values of a contour line) of the gas-bearing region as a gas-bearing porosity.

The method for acquiring logging parameters according the embodiment of the present application has high measurement precision and simpler and more intuitive calculation mode. The following is a step-by-step illustration of the aforementioned method:

S101, acquiring a two-dimensional nuclear magnetic logging analysis graph.

In an exemplary embodiment of the present application, the two-dimensional nuclear magnetic logging analysis graph may include a two-dimensional nuclear magnetic D-T2 graph, wherein D represents a diffusion coefficient and T2 represents transverse relaxation time.

Figure 2:
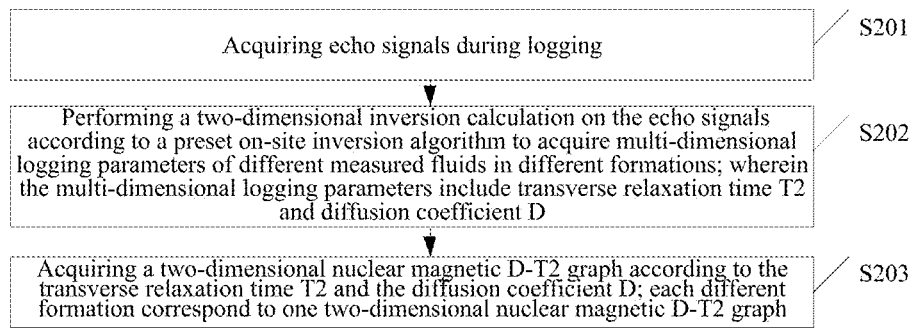
FIG. 2 is a flowchart of a method for acquiring a two-dimensional nuclear magnetic logging analysis graph according to an embodiment of the present application.

In an exemplary embodiment of the present application, as shown in FIG. 2, the acquisition of the two-dimensional nuclear magnetic logging analysis graph may include S201-S203:

S201, acquiring echo signals during logging.

S202, performing a two-dimensional inversion calculation on the echo signals according to a preset inversion algorithm to acquire multi-dimensional logging parameters of different measured fluids in different formations; wherein the multi-dimensional logging parameters include transverse relaxation time T2 and diffusion coefficient D;

S203, acquiring a two-dimensional nuclear magnetic D-T2 graph according to the transverse relaxation time T2 and the diffusion coefficient D; wherein different formations may each correspond to a two-dimensional nuclear magnetic D-T2 graph. The gas-bearing porosity includes gas-bearing porosities of different formations.

In an exemplary embodiment of the present application, the multi-dimensional logging parameters may be acquired by using a preset logging model, or may be acquired by performing actual logging with a multi-dimensional nuclear magnetic logging instrument.

In an exemplary embodiment of the present application, the acquisition of the multi-dimensional logging parameters by performing actual logging with the multi-dimensional nuclear magnetic logging instrument may include:

transmitting multiple first electromagnetic waves with different frequencies through a multi-dimensional nuclear magnetic logging instrument to detect different exploration depths (i.e., different formations) through the multiple first electromagnetic waves with different frequencies;

collecting electromagnetic wave signals of second electromagnetic waves generated by resonance of the first electromagnetic waves in the formations by a preset signal acquisition circuit, and the second electromagnetic wave is used as an echo;

performing inversion calculation on the electromagnetic wave signals to acquire corresponding multi-dimensional logging parameters.

In an exemplary embodiment of the present application, the electromagnetic wave signal may be subjected to two-dimensional inversion calculation according to a preset inversion algorithm for to acquire the multi-dimensional logging parameters. Parameters of the inversion algorithm may be set according to an actual situation of the logging site, which is not limited by the embodiment of this application.

In an exemplary embodiment of the present application, the preset inversion algorithm may include:

$$m(t,T_E)=\iiint f(T2,D)k1(t,T2)k2(t,T_E,D)d_D d_{T2}+\varepsilon;$$

Herein, $f(T2,D)$ is the distribution function of hydrogen nuclei in (T2,D) two-dimensional space, $m(t,T_E)$ is an amplitude of echo train with echo interval $T_E$ at time t, $k1(t,T2)$ is a function with t and T2 as variables, $k2(t,T_E,D)$ is a function with t, $T_E$ and D as variables, and $\varepsilon$ is noise.

In an exemplary embodiment of this application, two-dimensional (T2, D) logging may be achieved by: $m(t,T_E) = \iiint f(T2,D) k1(t,T2) k2(t,T_E,D) d_D d_{T2}+\varepsilon$.

In an exemplary embodiment of this application, the two-dimensional (T2, D) logging distinguishes fluids mainly by using a difference of time required for complete polarization of gas and time required for complete polarization of water.

In an exemplary embodiment of the present application, an executable program with graphical interface, which may be used for CFF data processing in oil fields, written by Intel Math Library under the framework of. Net, may be used for calculation, so as to improve the speed of the two-dimensional inversion calculation.

Figure 3:
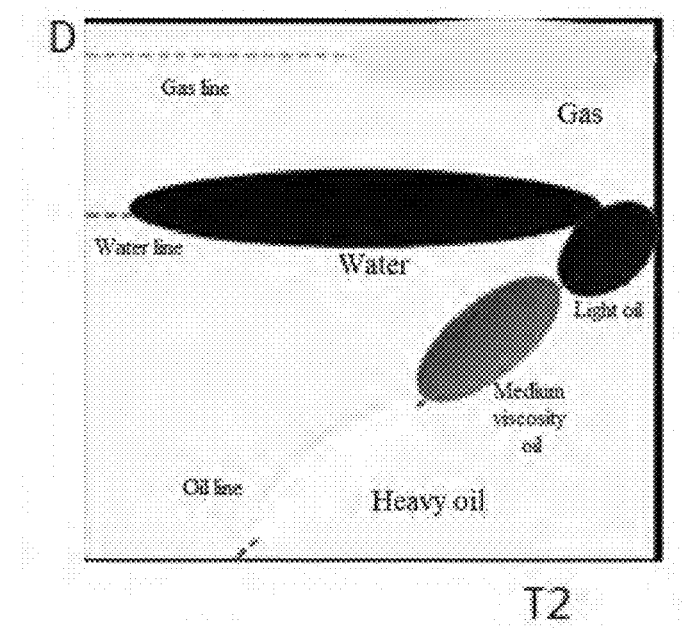
FIG. 3 is a schematic diagram of a two-dimensional nuclear magnetic D-T2 graph according to an embodiment of the present application.

In an exemplary embodiment of the present application, as shown in FIG. 3, a D-T2 two-dimensional spectrum may be acquired by detecting the transverse relaxation time T2 and the diffusion coefficient D, which may assist in determination of downhole fluid type and make more accurate determination of physical property at the same time.

In an exemplary embodiment of the present application, the difference of transverse relaxation time T2 and diffusion coefficient D between the measured fluids in different formations may be used to establish a contour distribution graph of D-T2 two-dimensional spectrum for presenting a nuclear magnetic spectrogram. That is, a contour graph may be drawn according to the acquired transverse relaxation time T2 and diffusion coefficient D, so as to acquire a D-T2 two-dimensional spectrum.

S102, determining a gas-bearing region from the two-dimensional nuclear magnetic logging analysis graph.

In an exemplary embodiment of the present application, the determination of the gas-bearing region from the two-dimensional nuclear magnetic logging analysis graph may include:

acquiring a diffusion coefficient D satisfying a first preset numerical range and a transverse relaxation time T2 satisfying a second preset numerical range from each two-dimensional nuclear magnetic D-T2 graph; and determining a region corresponding to the diffusion coefficient D satisfying the first preset numerical range and the transverse relaxation time T2 satisfying the second preset numerical range in each two-dimensional nuclear magnetic D-T2 graph as a gas-bearing region.

In an exemplary embodiment of the present application, the two-dimensional nuclear magnetic D-T2 graph may include any one or more of the following information: oil-bearing region, gas-bearing region, water-bearing region, oil line, gas line and water line.

In an exemplary embodiment of the present application, as shown in FIG. 3, oil-bearing regions, a gas-bearing region and a water-bearing region are clearly distinguished.

In an exemplary embodiment of the present application, in order to identify the gas-bearing region, the gas-bearing region in the two-dimensional nuclear magnetic D-T2 graph may be manually circled and determined by the circled range. Or, the gas-bearing region may be determined according to the numerical ranges of D and T2 that the gas-bearing region shall correspond to. The embodiment of the present application does not limit the manner of determining the gas-bearing region.

In an exemplary embodiment of this application, under certain working conditions, the range of diffusion coefficient D corresponding to the gas-bearing region, i.e., the first preset numerical range may include: being greater than $10^{-8}$ (i.e., 10 to the −8th power), and the range of transverse relaxation time T2 corresponding to the gas-bearing region, i.e., the second preset numerical range may include: being greater than 500 ms.

In an exemplary embodiment of the present application, the corresponding region circled in the two-dimensional nuclear magnetic D-T2 graph according to the first preset numerical range and the second preset numerical range is the gas-bearing region.

In an exemplary embodiment of the present application, the first preset numerical range and the second preset numerical range may change according to different working conditions (for example, different temperatures and pressures, etc.). Therefore, values included in the first preset numerical range and the second preset numerical range are not limited, and may be reasonably selected according to different working conditions.

S103, summing contour values (i.e. height values of the contour line) of the gas-bearing region as the gas-bearing porosity.

In an exemplary embodiment of the present application, the summing of the contour values of the gas-bearing region as the gas-bearing porosity may include:

summing contour values of the gas-bearing region in each two-dimensional nuclear magnetic D-T2 graph respectively as a gas-bearing porosity in a formation corresponding to the two-dimensional nuclear magnetic D-T2 graph.

In an exemplary embodiment of the present application, the two-dimensional nuclear magnetic D-T2 graph is a two-dimensional nuclear magnetic D-T2 graph for each formation (or each exploration depth). Therefore, a gas-bearing porosity of one formation may be acquired by one two-dimensional nuclear magnetic D-T2 graph.

In an exemplary embodiment of this application, since the two-dimensional spectrum is actually drawn by a matrix of contour lines, the sum of the numerical values of the contour line matrix of the gas-bearing region is a porosity of the gas-bearing region, that is, the gas-bearing porosity.

In an exemplary embodiment of the present application, the logging parameters may also include gas saturation; and the method may further include: calculating the gas saturation according to the calculated gas-bearing porosity and all contour values in the two-dimensional nuclear magnetic logging analysis graph.

In an exemplary embodiment of the present application, the logging parameters may also include gas saturations of different formations; and the method may further include: for different formations, calculating the gas saturation of each formation respectively according to the calculated gas-bearing porosity of the formation and all contour values in the two-dimensional nuclear magnetic logging analysis graph (two-dimensional nuclear magnetic D-T2 graph) corresponding to the formation.

In an exemplary embodiment of the present application, the two-dimensional nuclear magnetic logging analysis graph includes a two-dimensional nuclear magnetic D-T2 graph.

The respective calculation of the gas saturation of each formation according to the calculated gas-bearing porosity of the formation and all the contour values in the two-dimensional nuclear magnetic logging analysis graph corresponding to the formation may include:

taking a result of dividing the gas-bearing porosity of the formation by a sum of all the contour values in the two-dimensional nuclear magnetic D-T2 graph corresponding to the formation as the gas saturation of the formation.

In an exemplary embodiment of the present application, it is known that the two-dimensional spectrum is actually drawn by a matrix of contour lines. Hence after calculating the gas-bearing porosity, the sum of all element data of all contour lines in the graph calculated according to the two-dimensional nuclear magnetic D-T2 graph is the total porosity in the two-dimensional nuclear magnetic D-T2 graph, and the gas saturation of the formation corresponding to the two-dimensional nuclear magnetic D-T2 graph may be calculated by dividing the gas-bearing porosity by the total porosity.

In an exemplary embodiment of the present application, in different formations, a gas-bearing porosity curve and a gas saturation curve acquired based on two-dimensional nuclear magnetic technology may be compared with each other. If values of these two curves are both large (for example, a threshold value may be set as required, and when a value is greater than the set threshold value, the value may be considered as large), it may be considered as a good gas reservoir. According to the solution of the embodiment, gas reservoirs may be classified (good or bad) according to numerical values of different curves, so that the gas reservoirs may be quantitatively evaluated, leaving a more intuitive impression on technicians, which is more convenient for carrying out related work.

In an exemplary embodiment of the present application, the method may further include:

for the gas-bearing porosities and gas saturations calculated according to two-dimensional nuclear magnetic D-T2 graphs corresponding to different formations, sequentially arranging the gas porosities corresponding to different formations according to depths of the formations to form a gas-bearing porosity curve, and sequentially arranging the gas saturations corresponding to different formations according to the depths of the formations to form a gas saturation curve.

In the exemplary embodiment of the present application, it may be known from the above content that each depth point (each exploration depth) corresponds to one formation, and for each depth point, one two-dimensional spectrogram (such as the aforementioned two-dimensional nuclear magnetic D-T2 graph) may be correspondingly calculated. After calculating the gas-bearing porosity and the gas saturation of each depth point according to the above principle, the gas-bearing porosity and the gas saturation corresponding to each depth point of the whole well section may be acquired, that is, the gas-bearing porosity curve and the gas saturation curve corresponding to the well section may be acquired.

In an exemplary embodiment of this application, the embodiment of the present application directly analyzes gas-bearing porosity, gas saturation, gas-bearing porosity curve and gas saturation curve based on a two-dimensional nuclear magnetic resonance, which may include the following advantages:

(1) The analysis of oil, gas and water signals can be achieved through two-dimensional NMR, and signals distributed the upper right corner of two-dimensional NMR spectrum (i.e. two-dimensional spectrum or two-dimensional graph) may be definitely determined as gas signals, and an intuitive gas-bearing porosity may be acquired by delineating the gas signals, making whole solution simpler and more intuitive.

(2) Obtaining gas saturation by dividing the gas-bearing porosity by the total signal porosity in the two-dimensional nuclear magnetic spectrum is the most direct and simple calculation method at present.

(3) By comparing the gas-bearing porosity curve and the gas saturation curve, a gas reservoir may be identified when the gas-bearing porosity curve and the gas saturation curve are both high, and reservoirs may be classified and graded according to magnitudes of the gas saturations and gas-bearing porosities.

Figure 4:
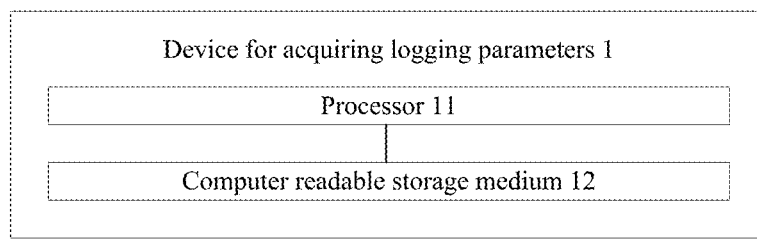
FIG. 4 is a block diagram of a device for acquiring logging parameters according to an embodiment of the present application.

An embodiment of the present application further provides a device 1 for acquiring logging parameters. As shown in FIG. 4, the device 1 for acquiring logging parameters may include a processor 11 and a computer readable storage medium 12, wherein instructions are stored in the computer readable storage medium 12nd the processor 11 executes the instructions to perform the foregoing method for acquiring logging parameters.

An embodiment of the present application further provides a computer readable storage medium, in which computer executable instructions are stored, and the computer executable instructions are used for performing the any one of the above methods for acquiring logging parameters.

Those of ordinary skill in the art may understand that all or some of the steps in the method, the system, and functional modules/units in the device disclosed above may be implemented as software, firmware, hardware, and an appropriate combination thereof. In hardware implementations, the division between functional modules/units mentioned in the above description does not necessarily correspond to the division of physical components. For example, a physical component may have multiple functions, or a function or a step may be performed by several physical components in cooperation. Some or all of the components may be implemented as software executed by a processor, such as a digital signal processor or a microprocessor, or as implemented hardware, or as implemented as an integrated circuit, such as an application specific integrated circuit. Such software may be distributed on a computer readable medium, which may include a computer storage medium (or a non-transitory medium) and a communication medium (or a transitory medium). As is well known to those of ordinary skill in the art, the term "computer storage medium" includes volatile and nonvolatile, removable and non-removable media implemented in any method or technology for storing information (such as computer readable instructions, a data structure, a program module or other data). The computer storage medium includes, but is not limited to, a random access memory (RAM), a read only memory (ROM), an electrically erasable programmable ROM (EEPROM), a flash memory or another memory technology, a compact disc-ROM (CD-ROM), a digital versatile disk (DVD) or another optical disk storage, a magnetic cassette, a magnetic tape, a magnetic disk storage or another magnetic storage device, or any other medium that may be used for storing desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

What is claimed is:

1. A method for acquiring logging parameters, wherein the logging parameters comprise a gas-bearing porosity and the method comprises:
    acquiring a two-dimensional nuclear magnetic logging analysis graph by utilizing a multi-dimensional nuclear magnetic logging instrument capable of transmitting electromagnetic waves with different frequencies;
    determining, by a processor, a gas-bearing region from the two-dimensional nuclear magnetic logging analysis graph; and
    summing, by the processor, contour values of the gas-bearing region as the gas-bearing porosity;
    wherein the two-dimensional nuclear magnetic logging analysis graph comprises a two-dimensional nuclear magnetic D-T2 graph, and D represents diffusion coefficient and T2 represents transverse relaxation time; and
    the two-dimensional nuclear magnetic D-T2 graph comprises the following information: oil-bearing region, gas-bearing region, water-bearing region, oil line, gas line and water line.

2. The method for acquiring logging parameters according to claim 1, wherein acquiring the two-dimensional nuclear magnetic logging analysis graph comprises:
    acquiring echo signals during logging;
    performing a two-dimensional inversion calculation on the echo signals according to a preset inversion algorithm to acquire multi-dimensional logging parameters of different measured fluids in different formations; the multi-dimensional logging parameters comprise the transverse relaxation time T2 and the diffusion coefficient D;
    acquiring the two-dimensional nuclear magnetic D-T2 graph according to the transverse relaxation time T2 and the diffusion coefficient D; wherein each of different formations corresponds to one two-dimensional nuclear magnetic D-T2 graph, and the gas-bearing porosity comprises the respective gas-bearing porosities of the different formations.

3. The method for acquiring logging parameters according to claim 2,
    wherein determining the gas-bearing region from the two-dimensional nuclear magnetic logging analysis graph comprises:
    acquiring a diffusion coefficient D satisfying a first preset numerical range and a transverse relaxation time T2 satisfying a second preset numerical range from each two-dimensional nuclear magnetic D-T2 graph; and
    determining a region corresponding to the diffusion coefficient D satisfying the first preset numerical range and the transverse relaxation time T2 satisfying the second preset numerical range in each two-dimensional nuclear magnetic D-T2 graph as a gas-bearing region.

4. The method for acquiring logging parameters according to claim 3, wherein the first preset numerical range includes: being greater than 10^-8; and the second present numerical range includes: being greater than 500 ms.

5. The method for acquiring logging parameters according to claim 3, wherein summing the contour values of the gas-bearing region as the gas-bearing porosity comprises:
    respectively summing the contour values of the gas-bearing region in each two-dimensional nuclear magnetic D-T2 graph as the gas-bearing porosity in a formation corresponding to the two-dimensional nuclear magnetic D-T2 graph.

6. The method for acquiring logging parameters according to claim 2, wherein the logging parameters further comprise gas saturations of different formations; and
    the method further comprises: for different formations, calculating the gas saturation of each formation respectively according to the calculated gas-bearing porosity of the formation and all contour values in a two-dimensional nuclear magnetic D-T2 graph corresponding to the formation,
    wherein calculating the gas saturation of each formation respectively according to the calculated gas-bearing porosity of the formation and all the contour values in the two-dimensional nuclear magnetic D-T2 graph corresponding to the formation comprises:
    taking a result of dividing the gas-bearing porosity of the formation by a sum of all the contour values in the two-dimensional nuclear magnetic D-T2 graph corresponding to the formation as the gas saturation of the formation.

7. The method for acquiring logging parameters according to claim 6, wherein the method further comprises:
    for the gas-bearing porosities and gas saturations calculated according to the two-dimensional nuclear magnetic D-T2 graphs corresponding to different formations, sequentially arranging the gas-bearing porosities corresponding to different formations according to depths of the formations to form a gas-bearing porosity curve, and sequentially arranging the gas saturations corresponding to different formations according to the depths of the formations to form a gas saturation curve.

8. A device for acquiring logging parameters, which comprises a processor and a computer readable storage medium, wherein instructions are stored in the computer readable storage medium, and when the instructions are executed by the processor, the method for acquiring logging parameters according to claim 1 is implemented.

9. A non-transitory computer readable storage medium storing computer executable instructions, wherein the computer executable instructions are used for executing the method for acquiring logging parameters according to claim 1.

\* \* \* \* \*